United States Patent [19]

Engler

[11] Patent Number: 4,641,434
[45] Date of Patent: Feb. 10, 1987

[54] INCLINATION MEASURING DEVICE

[76] Inventor: Max Engler, Solothurnerstrasse 187, 4600 Olten, Switzerland

[21] Appl. No.: 783,370

[22] Filed: Oct. 3, 1985

Related U.S. Application Data

[63] Continuation-in-part of Ser. No. 574,589, Jan. 27, 1984, abandoned.

[30] Foreign Application Priority Data

Jan. 28, 1983 [CH] Switzerland ............................ 502/83

[51] Int. Cl.⁴ .......................... G01C 9/06; G01C 9/20
[52] U.S. Cl. ......................................... 33/366; 33/377
[58] Field of Search .................................. 33/366, 377

[56] References Cited

U.S. PATENT DOCUMENTS

| | | | |
|---|---|---|---|
| 2,789,362 | 4/1957 | Maroth | 33/366 |
| 3,171,213 | 3/1965 | Swarts et al. | 36/206 |
| 3,442,023 | 1/1966 | Remington et al. | 33/206 |
| 3,604,275 | 9/1971 | Fox et al. | 33/206 |
| 3,906,471 | 9/1975 | Shawhan | 33/366 |
| 4,028,815 | 6/1977 | Buckley et al. | 33/366 |
| 4,244,117 | 1/1981 | Cantarella et al. | 33/366 |
| 4,254,334 | 3/1981 | Baud | 250/231 |
| 4,528,760 | 7/1985 | Plummer | 33/366 |

FOREIGN PATENT DOCUMENTS

| | | | |
|---|---|---|---|
| 2525698 | 1/1976 | Fed. Rep. of Germany | 33/366 |
| 1173494 | 2/1959 | France | 33/366 |
| 2261165 | 9/1975 | France | |
| 621192 | 1/1981 | Switzerland | |

Primary Examiner—Richard R. Stearns
Attorney, Agent, or Firm—Webb, Burden, Robinson & Webb

[57] ABSTRACT

The instrument includes a cylindrical chamber with two parallel end walls. At least one of the end walls is plated with two semicircular condenser plates forming a gap between them. The chamber is filled half and half with two non-intermixing liquids of different specific gravity. In one embodiment the other end wall is plated with a third condenser plate and the two liquids are non-conductive and have different dielectric properties. In another embodiment, the two condenser plates on the one end wall are plated with a dielectric layer and at least one of the two liquids is an electrolyte. The instrument has a high measuring range and high accuracy and resolution.

4 Claims, 5 Drawing Figures

U.S. Patent  Feb. 10, 1987  4,641,434
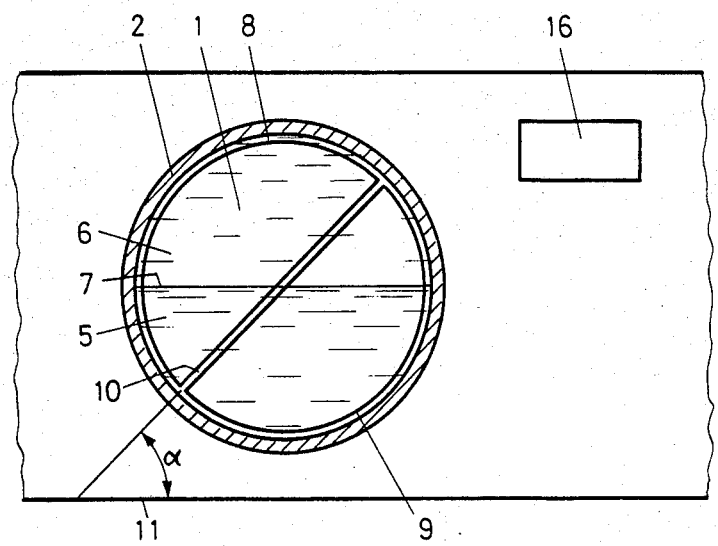
Fig. 1
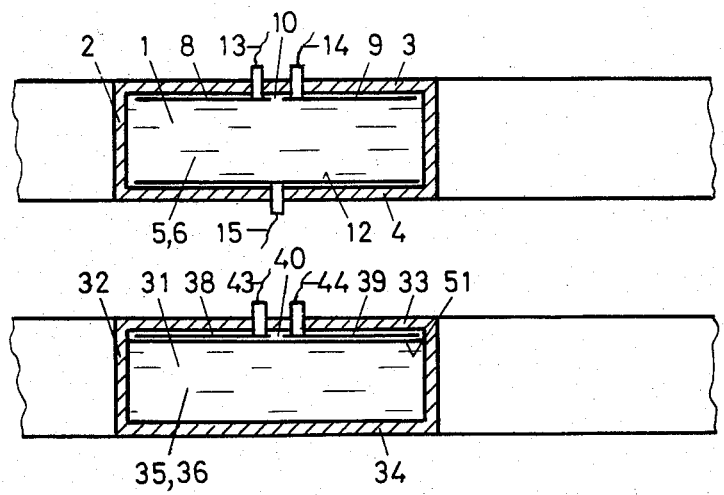
Fig. 2
Fig. 3
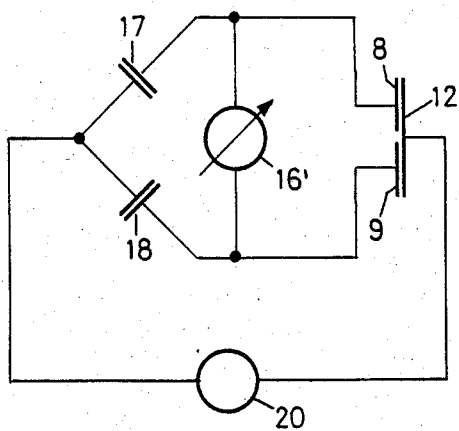
Fig. 4
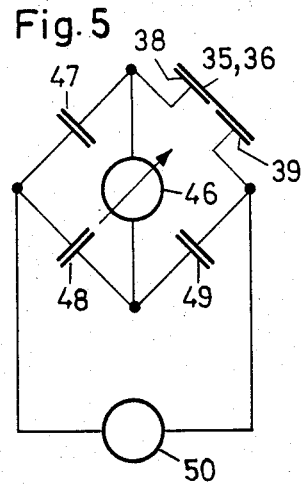
Fig. 5

INCLINATION MEASURING DEVICE

CROSS-REFERENCE TO RELATED APPLICATION

This application is a continuation-in-part of application Ser. No. 574,589, filed Jan. 27, 1984, now abandoned, and entitled "Spirit Level for Measuring Deviation from Perpendicular or Horizontal Lines or Planes."

FIELD OF THE INVENTION

The present invention relates to an inclination measuring instrument or spirit level for measuring deviations from a perpendicular or horizontal line or plane and, in particular, to an electrically actuated spirit level.

BRIEF DESCRIPTION OF THE PRIOR ART

There are numerous propositions in the state of the art for inclination measuring instruments with a cylindrical chamber containing a conductive liquid and two electrodes. The wetted area of the electrodes depends on the inclination of the instrument. Usually, there is a bridge circuit to detect the inclination from the different resistances associated with the different wetted surfaces. An example of this type of instrument is disclosed in U.S. Pat. No. 4,028,815.

A major drawback of these instruments is their inherent low damping property. When placing the instrument with its reference surface onto a surface to be measured, it takes quite a while until the liquid has settled to a steady level. Another problem is that there is usually a tendency associated with free surfaces of liquids to form bubbles. Such bubbles are a source of inaccuracies in known inclination measuring instruments. The surface tension of the liquid relative to the electrodes is a further source of inaccuracies, because the wetted surface, for a given inclination, depends on the sense of approach towards that inclination.

For all these reasons, the instruments with electrical rather than optical detection of inclination have not succeeded in gaining a considerable share of the total sales of level gauges.

Accordingly, it is an object of the present invention to provide an inclination measuring instrument for indicating a deviation from a level or vertical line or plane which is easy to use and which possesses the same characteristics as a conventional spirit level, and which has a better accuracy and resolution than the known instruments.

SUMMARY OF THE INVENTION

Accordingly, I have invented an inclination measuring instrument which includes a cylindrical chamber with two parallel, planar, radial end walls. At least one of the end walls, the first end wall, is plated with at least two condenser plates defining a gap between them. The chamber is filled half and half with two non-intermixing, non-intersoluble liquids of different specific gravity. The gap is preferably a straight line forming an angle of about 30 to about 60 degrees with respect to a reference surface of the instrument, and the end walls are perpendicular to the reference surface. The instrument preferably includes two semicircular condenser plates on the first end wall, with each condenser plate ideally a metal layer plated thereon.

In one embodiment of the invention, the two liquids are non-conductive and have different dielectric properties and a third, circular condenser plate is plated onto a second end wall. The condenser plates are wetted by the two liquids.

In a second embodiment of the invention, the condenser plates on the first end wall are plated with a solid dielectric layer and the two liquids have different electrolytic properties.

Illustrative examples of the invention are explained hereinafter with reference to the accompanying drawings.

BRIEF DESCRIPTION OF THE DRAWINGS

FIG. 1 is a side elevation of one embodiment of an inclination measuring instrument according to the present invention, partly in section;

FIG. 2 is a cross-section of the instrument shown in FIG. 1;

FIG. 3 is a cross-section of a further embodiment of an inclination measuring instrument according to the present invention;

FIG. 4 is a diagram of the electrical circuit of the embodiment shown in FIG. 2; and FIG. 5 is a diagram of the electrical circuit of the embodiment shown in FIG. 3.

DESCRIPTION OF PREFERRED EMBODIMENTS OF THE INVENTION

In the embodiment shown in FIGS. 1 and 2, the inclination measuring instrument contains a cylindrical chamber 1 surrounded by a cylindrical wall 2 and two parallel end walls 3, 4 which are perpendicular to the axis of the cylindrical wall 2. The cavity 1 is filled half and half with two non-intermixing liquids 5, 6 of different specific gravity. They form a horizontal boundary layer 7 therebetween. End wall 3 is plated with two semi-circular condenser plates 8, 9 with a narrow gap 10 between them, which forms an angle $\alpha$ of 45 degrees with a plane reference surface 11 of the instrument. The other wall 4 has a circular condenser plate 12 plated thereon. The three condenser plates 8, 9, 12 are wetted by the two liquids 5, 6 which have different dielectric constants and are non-conductive. Suitable combinations of such liquids are water and silicone oil and methanole and halogenized hydrocarbons such as methylenchloride. The condenser plates 8, 9, 12 are preferably thin film gold plated onto the end walls 3, 4 and are connected by leads 13, 14, 15 to an evaluating circuitry and subsequently to an indicating instrument 16, which may be in the form of a digital display.

In FIG. 4, a bridge circuit for measuring the relative capacitance of the two capacitors formed, on the one hand, of plate 8 and plate 12 and, on the other hand, of plate 9 and plate 12 is shown. The bridge is completed by two fixed capacitors 17, 18, one of which may be adjustable to calibrate the instrument. A power supply 20 is connected to one diagonal of the bridge circuit. An indicating instrument 16' measures the voltage across the other diagonal of the bridge circuit. Suitable amplifying circuitry (not shown) may be connected between the bridge and the indicating instrument 16'.

When the instrument is inclined relative to the position represented in FIG. 1, the boundary layer 7 forms a different angle to the gap 10. Due to the different dielectric properties of the two liquids 5, 6, the capacitance of the capacitor formed by plates 8 and 12 changes in relation to the capacitor formed by plates 9 and 12. Therefore, a voltage output proportional to the inclination angle of the instrument is indicated by the indicator 16'.

The instrument has a very wide measuring range of almost 180 degrees. Therefore, it is possible to measure both deviations from vertical and horizontal with the same instrument. For this reason, the gap 10 is formed with an angle of 30°–60°, preferably a 45 degree angle, with respect to the reference surface 11.

The embodiment of the inclination measuring instrument shown in FIG. 3 has the same overall configuration as the embodiment shown in FIGS. 1 and 2. The side elevation is identical to FIG. 1. In FIG. 3, the reference numerals are incremented by the number 30 with respect to the reference numerals of FIGS. 1 and 2 indicating the same elements.

One of the end walls 34 of the cylindrical chamber 31 is not plated with a condenser plate in this embodiment. The other end wall 33, as in the FIGS. 1 and 2 embodiment, is plated with two semicircular condenser plates 38, 39 forming a narrow gap 40 between them. The two plates 38, 39 are plated with a solid dielectric layer 51, e.g. of PTFE or other plastic material. In this case, the two non-intermixing liquids 35, 36 in the chamber 31 have different electrolytic properties. Suitable liquids are, e.g., a solution of salt and water, an acid and the like on the one hand, and silicone oil on the other hand. The two capacitor plates 38, 39 together with the two liquids form a variable condenser, the capacitance of which depends on the inclination of the instrument.

A suitable circuitry for connecting the variable condenser formed in the instrument shown in FIG. 3 to an indicating instrument is represented in FIG. 5. It is again a bridge circuit composed of the variable condenser formed by plates 38 and 39 and the two non-intermixing liquids 35 and 36 and of three fixed condensers 47, 48, 49. One of the condensers 47, 48, or 49 may be adjustable for calibration. A power supply 50 is connected across one diagonal of the bridge, and an indicating instrument 46 across the other diagonal. Changing the inclination of the instrument changes the capacitance of the variable condenser 38, 39, 35 and 36 and a voltage output proportional to the inclination angle of the instrument is indicated by indicating instrument 46.

By filling the chamber with two liquids of different specific gravity, the damping ratio is increased considerably. Therefore, a measurement can be taken much quicker. No bubbles are formed between the two liquids and the angle between the wall and the boundary layer separating the two liquids does not depend on the direction from which the actual position was reached. Therefore, the instrument according to the present invention is considerably more accurate and has a considerably better resolution than the known instruments. The gap is preferably formed with a 45 degree angle with a reference surface of the instrument. In this way, it is possible to measure deviations from both vertical and horizontal lines with the same instrument.

Having described the presently preferred embodiments of the invention, it is understood that it may be otherwise embodied within the scope of the appended claims.

I claim:

1. An inclination measuring instrument comprising a cylindrical chamber with two planar, parallel, radial end walls, a first of the end walls being plated with at least two condenser plates, the two plates defining a gap between them and being plated with a solid dielectric layer, and the chamber containing equal amounts, by volume, of two non-intermixing, non-intersoluble liquids of different specific gravity and different electrolytic properties.

2. The instrument according to claim 1 wherein the gap between said plates is a straight line forming an angle of about 30 to about 60 degrees with a reference surface of the instrument, the two end walls being perpendicular to the reference surface.

3. The instrument according to claim 1 wherein the condenser plates each consist of a metal layer plated onto the first end wall.

4. The instrument according to claim 1 including two condenser plates which are semicircular in configuration.

* * * * *